(12) United States Patent
Cornelissen et al.

(10) Patent No.: US 11,892,143 B2
(45) Date of Patent: Feb. 6, 2024

(54) COMPACT LASER BEAM COMBINER WITH MICRO-PRISM REFLECTOR

(71) Applicant: SIGNIFY HOLDING B.V., Eindhoven (NL)

(72) Inventors: Hugo Johan Cornelissen, Escharen (NL); Olexandr Valentynovych Vdovin, Maarheeze (NL); Robert Van Asselt, Valkenswaard (NL); Rifat Ata Mustafa Hikmet, Eindhoven (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/780,062

(22) PCT Filed: Nov. 23, 2020

(86) PCT No.: PCT/EP2020/083063
§ 371 (c)(1),
(2) Date: May 26, 2022

(87) PCT Pub. No.: WO2021/110456
PCT Pub. Date: Jun. 10, 2021

(65) Prior Publication Data
US 2023/0016179 A1 Jan. 19, 2023

(30) Foreign Application Priority Data
Dec. 3, 2019 (EP) ..................................... 19213077

(51) Int. Cl.
*G02B 5/04* (2006.01)
*G02B 27/10* (2006.01)
(Continued)

(52) U.S. Cl.
CPC ................ *F21V 13/04* (2013.01); *F21V 5/02* (2013.01); *F21V 9/30* (2018.02); *F21V 29/503* (2015.01);
(Continued)

(58) Field of Classification Search
CPC ............ G02B 19/0057; G02B 27/0972; G02B 6/0068; G02B 27/1006; G02B 5/04; G02B 27/12; G02B 27/30
See application file for complete search history.

(56) References Cited

U.S. PATENT DOCUMENTS

2006/0274434 A1* 12/2006 Mino .................... G02B 6/4214
359/811
2012/0236403 A1 9/2012 Sykora et al.
(Continued)

FOREIGN PATENT DOCUMENTS

CN 108919413 A 11/2018
EP 1992870 A2 11/2008
(Continued)

*Primary Examiner* — William J Carter

(57) ABSTRACT

The invention provides a light generating device (1000) comprising (i) a plurality of n light sources (100), and (ii) an optical component (1200) comprising an array (200) of prismatic elements (300), wherein: (a) the plurality of n light sources (100) comprise a first subset of one or more first light sources (110) configured to generate collimated first light source light (111) and a second subset of one or more second light sources (120) configured to generate collimated second light source light (121), wherein n>2; (b) the array (200) of prismatic elements (300) is configured in a light receiving relationship with the n light sources (100), wherein the array of prismatic elements (300) comprises k1 parallel arranged first prismatic faces (201) and k2 parallel arranged second prismatic faces (202), wherein k1>2 and wherein k2>2, wherein the first prismatic faces (201) and the second prismatic faces (202) are not mutually parallel; (c)

(Continued)

the first light sources (110) are configured to irradiate the first prismatic faces (201) and the second light sources (120) are configured to irradiate the second prismatic faces (202); and (d) the prismatic elements (300) are configured to reflect or refract the collimated first light source light (111) and the collimated second light source light (121) as coincident beams of first light source light (111) and second light source light (121).

15 Claims, 8 Drawing Sheets

(51) Int. Cl.

| | | |
|---|---|---|
| *G02B 27/12* | (2006.01) | |
| *G02B 27/30* | (2006.01) | |
| *F21V 13/04* | (2006.01) | |
| *F21V 29/503* | (2015.01) | |
| *F21V 9/30* | (2018.01) | |
| *F21V 5/02* | (2006.01) | |
| *F21Y 115/30* | (2016.01) | |
| *F21Y 113/10* | (2016.01) | |

(52) U.S. Cl.
CPC ......... *G02B 5/045* (2013.01); *G02B 27/1006* (2013.01); *G02B 27/126* (2013.01); *G02B 27/30* (2013.01); *F21Y 2113/10* (2016.08); *F21Y 2115/30* (2016.08)

(56) References Cited

U.S. PATENT DOCUMENTS

| | | | |
|---|---|---|---|
| 2013/0100974 A1* | 4/2013 | Janssens | ............ G03B 21/2013 |
| | | | 362/235 |
| 2014/0092364 A1 | 4/2014 | Janssens | |
| 2017/0051884 A1* | 2/2017 | Raring | ................. H01S 5/0233 |
| 2017/0271850 A1* | 9/2017 | Chow | ................... H01S 5/4093 |
| 2019/0146136 A1 | 5/2019 | Kakkar et al. | |

FOREIGN PATENT DOCUMENTS

| | | |
|---|---|---|
| WO | 2018210735 A1 | 11/2018 |
| WO | 2019090139 A1 | 5/2019 |
| WO | 2019165741 A1 | 9/2019 |

* cited by examiner

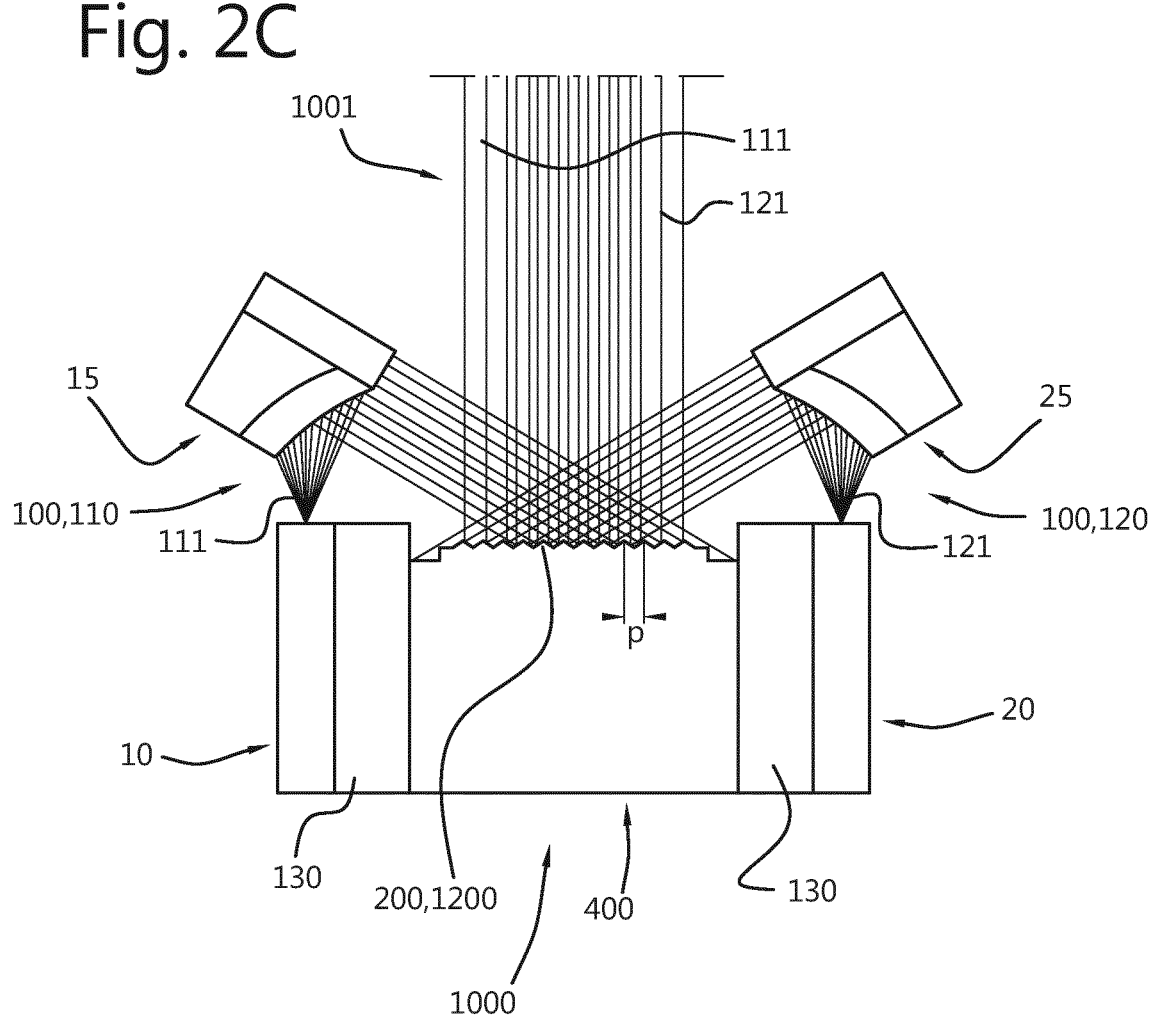

COMPACT LASER BEAM COMBINER WITH MICRO-PRISM REFLECTOR

CROSS-REFERENCE TO PRIOR APPLICATIONS

This application is the U.S. National Phase application under 35 U.S.C. § 371 of International Application No. PCT/EP2020/083063, filed on Nov. 23, 2020, which claims the benefit of European Patent Application No. 19213077.1, filed on Dec. 3, 2019. These applications are hereby incorporated by reference herein.

FIELD OF THE INVENTION

The invention relates to a light generating device and to a luminaire comprising such light generating device.

BACKGROUND OF THE INVENTION

Apparatus and methods for combining laser beams are known in the art. US2014/0092364, for instance, describes a first and a second laser light source outputting a first white laser light beam with a first polarization and a second white laser light beam with a second polarization that is orthogonal to the first polarization. Embodiments of US2014/0092364 utilize further a multi narrow-band polarizing beam splitter (operated as a beam combiner) positioned to receive the first and said second white laser light beams for combining the first and second polarizations. Further, US2014/0092364 describes a projection system with two laser light sources arranged to output two sets of laser light beams whose polarizations are orthogonal to each other and a multi narrow-band polarizing beam splitter positioned at an angle of about 45° between the first and second laser light beams. The sets of laser light beams may be provided at multiple wavelengths for three or more primary colors; red, green and blue or more.

SUMMARY OF THE INVENTION

While white LED sources can give an intensity of e.g. up to about 300 lm/mm$^2$; static phosphor converted laser white sources can give an intensity even up to about 20.000 lm/mm$^2$. Ce doped garnets (e.g. YAG, LuAG) may be the most suitable luminescent convertors which can be used for pumping with blue laser light as the garnet matrix has a very high chemical stability. Further, at low Ce concentrations (e.g. below 0.5%) temperature quenching may only occur above about 200° C. Furthermore, emission from Ce has a very fast decay time so that optical saturation can essentially be avoided. In applications, such as automotive, correlated color temperatures above about 5000 K at low CRI are desirable. However, in other applications e.g. light sources with a high CRI, like e.g. at least 90, and a relatively low CCT, like e.g. at maximum 3000 K, may be desirable. For instance, in some applications an intensity higher than 1 GCd/m$^2$ with CRI ≥90 and at lower CCT ≤3000K appear desirable. For a good color rendering and/or R9, addition of a red phosphor may be useful. However, it appears that such phosphors often cannot withstand high pump powers, and or show thermal quenching, and/or show degradation.

Pumping a ceramic phosphor with a focused blue laser diode can create a light source with e.g. about 10-20 times higher luminance than a phosphor-converted white LED, thus enabling tighter beam angle spots or miniaturized luminaires. It seems possible to provide relatively small narrow-beam light sources consisting of a blue laser diode and a ceramic Cerium-doped garnet phosphor plate. In order to generate a desired lumen flux the light of one single blue diode laser may not be sufficient, since it may be limited to about 5 W per chip. Combining the beams of several blue laser diodes may be a solution. However, in order to generate a desired color point, the light of a blue laser is (partly) wavelength converted with a phosphor, it seems useful if not necessary to add red (laser) light to achieve a high color rendering. In such embodiments, combining the beams of red and blue laser diodes may be required. Beam combining methods may e.g. be based on multi-core fibers, patched reflectors, or polarization- and dichroic filters. In such systems, it appears possible to combine tens to hundreds diode lasers. However, these systems appear to be highly complex and may contain costly components. There is a need for more effective solution to combine the beams of e.g. two or more laser diodes.

Hence, it is an aspect of the invention to provide an alternative light generating device, which preferably further at least partly obviates one or more of above-described drawbacks. The present invention may have as object to overcome or ameliorate at least one of the disadvantages of the prior art, or to provide a useful alternative.

In a first aspect, the invention provides a light generating device ("device" or "lighting device") comprising (i) a plurality of n light sources, and (ii) an optical component comprising an array of prismatic elements. Especially, the plurality of n light sources may comprise a first subset of one or more first light sources configured to generate collimated first light source light and a second subset of one or more second light sources configured to generate collimated second light source light. Further, especially n≥2. In embodiments, the array of prismatic elements may be configured in a light receiving relationship with the n light sources. Especially, the array of prismatic elements comprises k1 parallel arranged first prismatic faces and k2 parallel arranged second prismatic faces. In embodiments, k1≥1, more especially k1≥2. Alternatively or additionally, in embodiments k2≥1, more especially k2≥2. In specific embodiments, the first prismatic faces and the second prismatic faces are not mutually parallel. Yet further, in specific embodiments the first light sources are configured to irradiate the first prismatic faces and the second light sources are configured to irradiate the second prismatic faces. Especially, in embodiments the prismatic elements are configured to reflect or refract the collimated first light source light and the collimated second light source light, especially as coincident beams of (the) first light source light and (the) second light source light. Especially, the light generating device is configured to generate device light, which may comprise one or more of the first light source light and second light source light, and optionally also luminescent material light, would the light generating device further comprise a luminescent material configured to convert at least part of one or more of the first light source light and second light source light. Hence, in specific embodiments the invention provides a light generating device comprising (i) a plurality of n light sources, and (ii) an optical component comprising an array of prismatic elements, wherein: (a) the plurality of n light sources comprise a first subset of one or more first light sources configured to generate collimated first light source light and a second subset of one or more second light sources configured to generate collimated second light source light, wherein n≥2; (b) the array of prismatic elements is configured in a light receiving relationship with the n light sources, wherein the array of prismatic elements comprises k1 parallel arranged first prismatic faces and k2 parallel arranged second prismatic faces, wherein k1≥1, more especially wherein k1≥2, and wherein k2≥1, more especially wherein k2≥2, wherein the first prismatic faces and the second prismatic faces are not mutually parallel; (c) the first light sources are configured to irradiate the first prismatic faces and the second light sources are configured to irradiate the second prismatic faces; and (d) the prismatic elements are configured to reflect or refract the collimated first light source light and the collimated second light source light as coincident beams of (collimated) first light source light and (collimated) second light source light. The coincident beams of (collimated) first light source light and (collimated) second light source light emanate from the light generating device. Hence, device light generated by the light generating device may in embodiments comprise or in embodiments essentially consist of coincident beams of (collimated) first light source light and (collimated) second light source light. Hence, in embodiments the light generating device comprises a beam combiner. The light generating device may be arranged to generate white light.

With such device it is possible to combine two or more beams of collimated light, such as especially two or more beams of collimated laser light. Hence, with such device it may be possible to provide high intensity radiation. Further, with such device it may possible to create a relatively even distribution of the two or laser beams over the resulting beam of (device) light. Further, especially the (collimated) laser light may remain (strictly) collimated. Further, with such device the beams of the various lasers may be interleaved, in embodiments even without overlap and/or without dark gaps. Further, also the polarization state of the laser beams may be preserved. In embodiments, the device may be used to combine essentially the same (laser) light sources, thereby providing a coincident beam of the light source light of such (laser) light sources. This may provide a high intensity beam of device light, which may in specific embodiments be essentially monochromatic. In other embodiments, however, at least part of the first light source light and/or at least part of the second light source light may be converted by a luminescent material (into luminescent material light). Further, it may in embodiments be possible to provide white light with a relatively high intensity and with a relatively broad range of correlated color temperature and with a relatively high color rendering index, such as at least 75, like even about 80, or even above, such as at least 85, like even at least 90. The light generating device may (thus) also be indicated as light beam combining device or may comprise such light beam combiner.

As indicated above, the light generating device is configured to generate device light comprising one or more of the first light source light and the second light source light, and optionally also luminescent material light. To this end, the light generating device comprises a first light source, a second light source, and optionally a luminescent material. In specific embodiments, the light generating device is configured to generate device light comprising essentially only luminescent material light. In such embodiments essentially all first light source light and second light source light may be converted into luminescent material light (and optionally heat).

Here below, first some aspects in relation to the first light source and the second light source are described, followed by some aspects in relation the optional luminescent material.

The device comprises a plurality of n light sources. Here, the term "n light sources" especially refer to at least 2 light sources. Hence, n>2. In specific embodiments, however, there may be more than two light sources, such as 4, 16, or much more, like at least 32, or at least 64, or yet even much more.

In embodiments, the plurality of light sources comprises a first subset of one or more first light sources and a second subset of one or more second light sources. These subset of light sources may provide radiation to different prismatic faces. See also below. However, when the prismatic faces are large and/or elongated, a plurality of light source may provide radiation to the same prismatic face. Herein, however, the fact that there are at least two subset of light sources, especially refers to embodiments where two subsets of light sources provide radiation to different (types of) prismatic faces (see also below). However, there may be more than two subsets of light sources. Each subset of light sources may provide radiation to a respective type of prismatic faces. However, in embodiments there may also be two or more subsets of the more than two subsets of light sources that may address the same type of prismatic faces (e.g. first prismatic faces or second prismatic faces, etc.).

Each subset may comprise one or more light sources. In specific embodiments, one or more of the at least two subsets of light sources comprise a plurality of light sources. For instance, as further also elucidated below in embodiments one or more of the at least two subsets of light sources, such as each of the at least two subsets of light sources comprise a plurality of laser light sources.

In general, all light sources within a subset may provide radiation having essentially identical spectral power distributions. For instance, each light source within a subset may comprise a solid state light source of the same bin. With the invention, the beams of such light sources can be combined.

The first subset and the second subset of light sources may generate respective radiations that have different spectral power distributions. However, in yet other embodiments the first subset and the second subset of light sources may generate respective radiations that have essentially identical spectral power distributions. Especially, however, in (specific) embodiments the one or more first light sources of the first subset may provide radiation having a different spectral power distribution than the one or more second light sources of the second subset, such as e.g. blue and red light, respectively. Hence, in embodiments the first light source light and the second light source light may mutually differ. Hence, in embodiments the first light source and the second light source may be different as the spectral power distributions may mutually differ. Alternatively or additionally, one or more first light sources of the first subset of first light sources may provide first light source light having a different spectral power distribution than one or more other first light sources of the first subset of first light sources. Yet alternatively or additionally, one or more second light sources of the second subset of second light sources may provide second light source light having a different spectral power distribution than one or more other second light sources of the second subset of second light sources. Hence, many combinations of the same light sources and of different light sources may be possible, and may be used to generate a combined beam.

When light sources with different spectral power distributions are applied, it may be useful to pattern-wise irradiation the prismatic elements. In this way, light mixing may be most efficient. However, also when light sources with essentially the same spectral power distributions are applied, it may be useful to pattern-wise irradiation the prismatic elements.

Hence, in embodiments a first subset of one or more first light sources may emit light of same color (or spectral power distribution). Alternatively or additionally, in embodiments a second subset of one or more second light sources may emit light of same color (or spectral power distribution).

In specific embodiments a first subset of one or more first light sources may emit light having the same polarization. Alternatively or additionally, in embodiments a second subset of one or more second light sources may emit light having same polarization (which may be the same or different from the first light sources of the first subset).

In embodiments, a first subset of one or more first light sources and a second subset of one or more second light sources may emit light of (essentially) same color (or spectral power distribution). Such beams may be combined with the herein described device (or beam combiner), whereas this would substantially not be possible with a dichroic-based light combiner.

In embodiments, a first subset of one or more first light sources and a second subset of one or more second light sources may emit light having (essentially) the same polarization, whereas this would substantially not be possible with a polarizer-based light combiner.

Here below, some aspects in relation to the first light source and the second light source, are discussed.

In specific embodiments, colors or color points (or spectral power distributions) of a first type of light source light and a second type of light may be different when the respective color points of the first type of light and the second type of light source light differ with at least 0.01 for u' and/or with least 0.01 for v', even more especially at least 0.02 for u' and/or with least 0.02 for v'. In yet more specific embodiments, the respective color points of first type of light and the second type of light may differ with at least 0.03 for u' and/or with least 0.03 for v'. Here, u' and v' are color coordinate of the light in the CIE 1976 UCS (uniform chromaticity scale) diagram.

As indicated above, in embodiments the light generating device may comprise a first light source configured to generate first light source light, such as in embodiments blue first light source light. Hence, in embodiments the first light source light may have a color point in the blue.

Especially, the first light source may comprise a first laser light source. The first laser light source is especially configured to generate first laser light source light. The first light source light may in embodiments essentially consist of the first laser light source light. Hence, in embodiments the first light source is a first laser light source. In embodiments, the term "first light source" may also refer to a plurality of the same first light sources. In embodiments, a bank of first laser light sources may be applied. Alternatively or additionally, the term "first light source" may also refer to a plurality of different first light sources. In embodiments, the term "first laser light source" may also refer to a plurality of the same first laser light sources. Alternatively or additionally, the term "first laser light source" may also refer to a plurality of different first laser light sources.

As indicated above, the light generating device may comprise a second light source configured to generate second light source light, such as in embodiments red second light source light. Hence, in embodiments the second light source light may have a color point in the red.

Especially, the second light source may comprise a second laser light source. The second laser light source is especially configured to generate second laser light source light. The second light source light may in embodiments essentially consist of the second laser light source light. Hence, in embodiments the second light source is a second laser light source. In embodiments, the term "second light source" may also refer to a plurality of the same second light sources. In embodiments, a bank of second laser light sources may be applied. Alternatively or additionally, the term "second light source" may also refer to a plurality of different second light sources. In embodiments, the term "second laser light source" may also refer to a plurality of the same second laser light sources.

Herein, the terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The term "amber" may refer to one or more wavelengths selected from the range of about 585-605 nm, such as about 590-600 nm. The terms "red light" or "red emission" especially relate to light having a wavelength in the range of about 615-780 nm, more especially 620-780 nm. The term "pink light" or "pink emission" refers to light having a blue and a red component. The terms "visible", "visible light" or "visible emission" and similar terms refer to light having one or more wavelengths in the range of about 380-780 nm.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to visible light.

Further, herein the term "first light source" may also refer to one or more first light sources; likewise, the term "second light source" may also refer to one or more second light sources; etc.

Hence, the phrases "plurality of n light sources comprise a first subset of one or more first light sources and a second subset of one or more second light sources" or "plurality of n light sources comprise a first subset of one or more first light sources configured to generate first light source light and a second subset of one or more second light sources configured to generate second light source light", and similar phrases, may refer to embodiments wherein there are only two subsets, but may in embodiments also refer to two or more subsets of light sources. In specific embodiments, there may be three or more different subsets of light sources. For instance, a first subset of first light sources may be configured to generate blue first light source light, a second subset of second light sources may be configured to generate red second light source light, and a third subset of third light source may be configured to generate amber third light source light or cyan third light source light. Or, in embodiments a first subset of first light sources may be configured to generate blue first light source light, a second subset of second light sources may be configured to generate red second light source light, a third subset of third light source may be configured to generate amber third light source light, and a fourth subset of fourth light source is configured to generate cyan fourth light source light.

Especially, the first subset of one or more first light sources is configured to generate collimated first light source light. Further, especially the second subset of one or more second light sources is (also) configured to generate collimated second light source light. To this end, optionally (collimating) optics may be applied. Such optics may be comprised by the one or more first light sources and/or by one or more second light sources. Examples of suitable optics for collimation are lenses, collimators, and paraboloid reflectors. Hence, the collimator element may comprise one or more of lenses, collimators, and paraboloid reflectors. Especially, paraboloid reflectors may be used, as they may allow a compact design of the light generating device.

In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide such (high) collimation (see also above).

In specific embodiments, the first light sources may comprise first laser light sources configured to generate first laser light source light and (first) collimating elements configured to provide collimated first laser light source light. Alternatively or additionally, the second light sources may comprise second laser light sources configured to generate second laser light source light and (second) collimating elements configured to provide collimated second laser light source light. Hence, in embodiments downstream of each laser light source a collimator may be configured, for collimating the laser light source light (and to provide collimated light source light). This may provide (laser) light source light having a collimation of in embodiments ≤2° (FWHM) (see also above). Further, in specific embodiments the collimators may comprise paraboloid reflectors. Paraboloid reflectors may collimate well.

Especially for laser diodes collimation may be desirable. However, other lasers may provide collimated laser light source light per se. Hence, in embodiments (i) the first light sources may comprise first laser light sources configured to generate first laser light source light (and optionally collimating elements configured to provide (further) collimated first (laser) light source light), and/or (ii) the second light sources comprise second laser light sources configured to generate second laser light source light (and optionally collimating elements configured to provide (further) collimated second (laser) light source light).

Hence, the light sources described herein may especially provide collimated light source light (se also above). This collimation may be achieved by e.g. using a laser that provides collimated laser light source light per se. Alternatively or additionally, this collimation may be achieved by e.g. using a laser that provides less or no collimated laser light source light in combination with a downstream configured collimating element. In both embodiments, collimated light source light is provided (which in the latter embodiments may essentially consists of collimated laser light source light).

Further, as indicated above the light generating device may comprises an optical component comprising an array of prismatic elements. In embodiments, the optical component may essentially consist of the array, Here, the term "array" may refer to at least two prismatic elements. Especially, however, the array comprises at least 4, such as at least 8 prismatic elements. The prismatic elements may be configured in a 1D array or in a 2D array.

In embodiments, the prismatic elements comprise triangular prisms. One side may be irradiated with the first light source light, and optionally light source light of other light sources (other than the second light sources), and another side may be irradiated with the second light source light, and optionally light source light of other light sources (other than the first light sources). Where triangular prisms by definition are characterized by three flat sides, in embodiments the prismatic elements may have non-flat sides such as curved or facetted. Hence, in embodiments the triangular prisms may have two (elongated) essentially flat faces and a base face (which may also essentially be flat). Alternatively, the two (elongated) faces may have one or more curvatures. However, cross-sections may have an overall triangular shape. Instead of the term "face", also the term "facet" may be applied.

In the case of e.g. prismatic elements, such elements may (thus) be elongated, especially to such an extent that as to allow a plurality of light sources irradiating a single face. For instance, two or more light sources may irradiate the same face. Even more especially, four or more light sources may irradiate the same face, such as at least eight light sources, or even more.

In specific embodiments, at least one dimension of the prismatic element(s), like the height and/or the base width, may be selected from the range of 5 μm-1 mm, such as 5-500 μm. Even more especially, both the base width and the height may be selected from the range of μm-1 mm, such as 5-500 μm. In embodiments, the array of prismatic elements may have a pitch selected from the range of about 5-100 μm, even more especially selected from the range of about 5-50 μm. When the pitch is below about 50 μm, mixing of the different beams may be to such an extent that the human eye may not see possible inhomogeneities.

As indicated above, the array of prismatic elements is especially configured in a light receiving relationship with the n light sources. Hence, the array of prismatic elements may be configured downstream of both the first light source (s) and the second light source(s) (and optionally further light sources, see also above). The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream". In other words, the optical component, especially the array of prismatic elements, may be radiationally coupled with the first light source(s) and the second light source(s).

Especially, each prismatic structure comprises a first prismatic face (or first prismatic facet) and a second prismatic face (or second prismatic facet), which may be configured under a mutual angle. The first prismatic face and the second prismatic face may extend from a base plane (or base facet) and combine at an apex of the prismatic structure.

Though it is not excluded that there are different prismatic elements in the sense of different angles, length, widths, etc., in specific embodiments the array comprises essentially identical prismatic structures, at least in terms of the apex angle and base angles.

Hence, in embodiment the array of prismatic elements comprises k1 parallel arranged first prismatic faces and k2 parallel arranged second prismatic faces, wherein k1>2 and wherein k2>2, wherein the first prismatic faces and the second prismatic faces are not mutually parallel. Especially, in embodiments k1=k2. For instance, when applying n (essentially identical) triangular prism, the prismatic faces may be defined by the apices, with each triangular prism having a first prismatic face and a second prismatic face.

Hence, in such embodiments n=k1=k2. Hence, in embodiments the first prismatic faces of different prismatic elements may be configured parallel and/or the second prismatic faces of different prismatic elements may be configured parallel (though especially the first and the second prismatic faces are mutually not parallel).

The term "not mutually parallel" may refer to the prismatic faces (i.e. the first prismatic face and the second prismatic face) that may not have a mutual angle (γ1) of 0° or 180°. The prismatic element may have a symmetric or non-symmetric cross-section. Hence, the base angles may be identical or may differ. In specific embodiments, the prismatic faces are mirror images.

As indicated above, the array of prismatic elements may be configured downstream of both the first light sources and the second light sources (and optionally further light sources). Especially, in embodiments the first light sources are configured to irradiate the first prismatic faces and the second light sources are configured to irradiate the second prismatic faces. As also mentioned elsewhere, "first" and "second" are only used as indications.

Basically, the prismatic structures and the light sources may be configured such, that the prismatic structures refract the radiation or reflect the radiation. Further, the prismatic structures and the light sources may be configured such that the first light source light and the second light source light may again propagate away (after reflection or refraction) from the prismatic structures coincidently. Hence, in this way the collimated light source light of the different light sources is combined in a single (collimated) beam. This may be obtained by selecting the angles of the irradiation beams of the light sources and the shapes and material of the prismatic structures (see also below). Hence, especially in embodiments the prismatic elements may be configured to reflect or refract the collimated first light source light and the collimated second light source light as coincident beams of (collimated) first light source light and (collimated) second light source light. Hence, the device light may in embodiments comprise as coincident beams of (collimated) first light source light and (collimated) second light source light. For the definition of "collimated" and similar terms, see also above. Coincident light beams may be essentially parallel. The optical axes are, however, not necessarily coincidental optical axes. However, especially the optical axes (downstream of the optical component) are essentially parallel.

Below, some embodiments are described in more detail.

In embodiments, the light sources, especially the laser light sources may be thermally coupled with a thermally conductive body. Alternatively or additionally, the prismatic elements, or an optical component comprising the prismatic elements, may be thermally coupled to a thermally conductive body. The thermally conductive body comprises a thermally conductive material. The thermally conductive body may comprise a heat spreader element or a heat sink element. A thermally conductive material may especially have a thermal conductivity of at least about 20 W/m/K, like at least about 30 W/m/K, such as at least about 100 W/m/K, like especially at least about 200 W/m/K. Heatsinks are known in the art. The term "heatsink" (or heat sink) may especially be a passive heat exchanger that transfers the heat generated by device, such as an electronic device or a mechanical device, to a fluid (cooling) medium, often air or a liquid coolant. Thereby, the heat is (at least partially) dissipated away from the device. A heat sink is especially designed to maximize its surface area in contact with the fluid cooling medium surrounding it. Hence, especially a heatsink may comprise a plurality of fins. For instance, the heatsink may be a body with a plurality of fins extending thereof. A heatsink especially comprises (more especially consists of) a thermally conductive material. In embodiments, a heatsink may comprise or consist of one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the heatsink may comprise or consist of aluminum oxide. The term "heatsink" may also refer to a plurality of (different) heatsinks. In embodiments, the light generating device may comprise a thermally conductive body, wherein the plurality of n light sources and the prismatic elements are thermally coupled with the thermally conductive body.

Instead of the term "thermally coupled" also the term "thermal contact" may be applied. An element may be considered in thermal contact with another element if it can exchange energy through the process of heat. In embodiments, thermal contact can be achieved by physical contact. In embodiments, thermal contact may be achieved via a thermally conductive material, such as a thermally conductive glue (or thermally conductive adhesive). Thermal contact may also be achieved between two elements when the two elements are arranged relative to each other at a distance of equal to or less than about 10 μm, though larger distances, such as up to 100 μm may be possible. The shorter the distance, the better the thermal contact. Especially, the distance is 10 μm or less, such as 5 μm or less. The distance may be the distanced between two respective surfaces of the respective elements.

In embodiments, the plurality of light sources and the optical component (which may also be indicated as "beam combiner") may be arranged on a heat sink. In embodiments, the plurality of light sources and the optical component may be arranged on the same heat sink.

In embodiments, the plurality of light sources may be arranged on a printed circuit board. In embodiments, the printed circuit board may comprise an electrically insulating layer arranged between a substrate and patterned electrodes. In embodiments, the patterned electrodes may be configured to electrically connect a driver to the laser diodes. Further, in embodiments the printed circuit board may be a metal core printed circuit board. In specific embodiments, the plurality of light sources and the optical component may be arranged on the same printed circuit board (i.e. it may become a laser package). In embodiments, the printed circuit board may be (physically) connected to an external heat sink.

Amongst others, there may be two types of embodiments. First embodiments may be based on reflection and second embodiments may be based on refraction. In the former embodiments, the light of the light sources may directly irradiate the facets, from which the light source light is reflected. In the latter embodiments, light source light may enter a further facet or face, like e.g. the base plane of the prismatic element, propagate through the prismatic element, and be refracted at the first facet or the second facet. Hence, in these latter embodiments, the first light sources may be configured to indirectly irradiate the first prismatic faces and the second light sources may be configured to indirectly irradiate the second prismatic faces.

First, some reflective embodiments are further elucidated. Thereafter some refractive embodiments are further elucidated.

In embodiments, the prismatic elements are reflective for the first light source light and the second light source light.

Especially, the prismatic faces to which the light source light may reflect are specular reflective. The prismatic element may be reflective because of the material used, such as e.g. silver (Ag) or aluminum (Al), etc. In alternative embodiments, the prismatic element may comprise gold (Au), which may be reflective for e.g. IR lasers. The prismatic elements may also be coated with a reflective coating layer, such as (other) metal layers, a dielectric thin film reflector (such as comprising a stack of films with different thickness and refractive indices), or a combination of two or more of these.

However, additionally or alternatively other materials may be used, such as (light transmissive) polymeric material. Also at the faces of prismatic structures of polymeric material light source light may be reflected.

Especially, the prismatic elements are shaped such and the angle of incidence of the light sources is chosen such, that reflection is obtained. This is known to person skilled in the art.

It surprisingly appears that specific prismatic shape provide best results in terms of reflection, mixing, and preventing stray light. Especially, prismatic elements with top angles of about 120° may be useful. Hence, in embodiments the first prismatic faces and the second prismatic faces of the prismatic elements define a first top angle ($\gamma 1$) selected from the range of 120°±15°, especially 120°±10°, even more especially 120°±5°. The base angles ($\beta 1$) of the prismatic faces may then in embodiments (each) be 0.5*(180−$\gamma 1$).

Further, it appears useful when the collimated first light source light approximately skims (planes) over the second face to reach the first face or skims and/or when the collimated second light source light approximately skims over the first face to reach the second face. With smaller or larger angles, light source light may be reflected at another type of face than the intended face, leading to stray light, or may not reach the intended face, leading to non-flashed areas. Hence, especially relative to a plane (this may be the base plane) the first prismatic faces and the second prismatic faces of the prismatic elements have first base angles ($\beta 1$) selected from the range of 30°±5°. In (yet further) specific the first light source light has a first optical axis (O1) and the second light source light has a second optical axis (O2) wherein the optical axes (O1,O2) have beam angles ($\alpha 1, \alpha 2$) with the plane that are equal to or smaller than the respective base angles ($\beta 1$).

In yet other embodiments, the prismatic elements are refractive for the first light source light and the second light source light. The prismatic element may be refractive because of the material used. Especially, the material of the prismatic element is light transmissive, more especially essentially transparent. For instance, light transmissive polymeric material may be used. Alternatively glass or quartz may be applied, such as optical quality glass. First and/or second light source light may enter the prismatic structure via the base plane, propagate through the prismatic structure and be refracted at the first prismatic faces or the second prismatic faces. The light source light may thus irradiate the first prismatic faces or the second prismatic faces, but only after first having propagated from the base plane to such prismatic face. Especially, the prismatic elements are shaped such and the angle of incidence of the light sources is chosen such, that refraction is obtained. This is known to person skilled in the art.

It surprisingly appears that specific prismatic shape provide best results in terms of reflection, mixing, and preventing stray light. Especially, prismatic elements with top angles of about 55° may be useful. Hence, in embodiments the first prismatic faces and the second prismatic faces of the prismatic elements define a first top angle ($\gamma 1$) selected from the range of 55°±15°, especially selected from the range of 55°±10°, yet even more especially selected from the range of 55°±5°. The base angles of the prismatic faces may then in embodiments (each) be 0.5*(180−$\gamma 1$).

As indicated above, in the case of refractive prismatic elements light incoupling may e.g. take place via a base plane or base facet. The angle of incidence may be chosen such that when coupling out via the first facet or the second the first light source light and second light source light escape coincident. Hence, in embodiments the prismatic elements comprise a base plane, wherein the first light source light has a first optical axis (O1) and wherein the second light source light has a second optical axis (O2), wherein the optical axes (O1,O2) have beam incidence angles ($\theta 1, \theta 2$) with a normal (N) to the base plane that are selected from the range of 45°±10°.

In embodiments, the prismatic elements may be comprised by or extend from a light transmissive body. Light source light may enter the body elsewhere, propagate to the prismatic elements and be reflected or refracted. Hence, in specific embodiments the light generating device comprises a light transmissive body, wherein the prismatic elements are comprised by the light transmissive body.

Herein, light transmissive materials are mentioned in relation to several embodiments. The light transmissive material may comprise one or more materials selected from the group consisting of a transmissive organic material, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), including in an embodiment (PETG) (glycol modified polyethylene terephthalate), PDMS (polydimethylsiloxane), and COC (cyclo olefin copolymer). Especially, the light transmissive material may comprise an aromatic polyester, or a copolymer thereof, such as e.g. polycarbonate (PC), poly (methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN); especially, the light transmissive material may comprise polyethylene terephthalate (PET). Hence, the light transmissive material is especially a polymeric light transmissive material. However, in another embodiment the light transmissive material may comprise an inorganic material. Especially, the inorganic light transmissive material may be selected from the group consisting of glasses, (fused) quartz, transmissive ceramic materials, and optionally silicones. Also hybrid materials, comprising both inorganic and organic parts may be applied. Especially, the light transmissive material comprises one or more of PMMA, transparent PC, or glass. Especially, the light transmissive material comprises a polymeric material. Alternatively, the light transmissive material comprises glass or quartz, such as optical quality glass.

In embodiments, the light generating device may comprise multiple optical components. In specific embodiments, the light generating device may be configured to combine beams of light that are a result of herein described beam combination. Hence, in embodiments the light generation device comprises a cascade of two or more beam optical components.

In embodiments, the light generating device may comprise the beam combiner as described herein, but may further also include conventional beam combiners e.g. based on multi-core fibers, patched reflectors, and/or polarization- and dichroic filters.

For instance, the invention may provide a beam combiner as defined herein for combining light of a first polarization and light of a second polarization different from the first polarization (by optionally (also) using a polarizer). For instance, the invention may provide a beam combiner as defined herein for combining light of a first spectral distribution and light of a second spectral distribution, different from the first spectral distribution, by using a dichroic. For instance, a first beam combiner may be configured to combine blue, a second beam combiner may be configured to combine green, a third beam combiner may be configured to combine red, and these colors may be combined using dichroics.

The above indicated laser package may in embodiments comprise a beam dump.

The beam combiner element may comprise an optical component comprising an array of prismatic elements. Optionally, the beam combiner element may further also comprise the plurality of n light sources.

The first light source light and or second light source light escaping from the prismatic elements (and which escape coincident when both provided to the prismatic elements) may be used as such. For instance, a strong monochromatic light generating device may be provided. However, also a white light generating device or colored light generating device may be provided. For instance, this may be based on the RGB principle, or the RGBY principle, as known to the person skilled in the art. In specific embodiments, such light generating device may be entirely laser-based.

In specific embodiments, part of the light source light is used to generate luminescent material light. Hence, in specific embodiments the light generating device may further comprise a luminescent material configured downstream of the prismatic elements, wherein the luminescent material is configured to convert at least part of one or more of the first light source light and the second light source light into luminescent material light. Specific embodiments of the luminescent material are further described below. In such embodiments, the light generating device may be laser and luminescent material based.

In specific embodiments, the luminescent material may e.g. be provided as ceramic body or may be comprised by a ceramic body. Hence, in embodiments the light generating device may further comprise a ceramic body configured downstream of the prismatic elements, wherein ceramic body comprises the luminescent material, and wherein the ceramic body is transmissive for at least part of one or more of the first light source light and the second light source light.

As indicated above, the light generating device is especially configured to generate device light. In specific embodiments, the device light may comprise one or more of (i) the first light source light, (ii) the second light source light, and (iii) the luminescent material light (see above).

In specific embodiments, the light generating device is configured to generate white device light in one or more operational modes of the light generating device. This may be based on a light generating device using a luminescent material as described above or based on a light generating device comprising different light sources with different colors, which may together provide white light in an operation mode.

The light generating device may further comprise a control system to control one or more of the first light sources and the second light sources. In specific embodiments, the light generating device may further comprise a control system to control one or more of the subset of first light sources and the subset of second light sources. Hence, in specific embodiments the light generating device may comprise a control system configured to control one or more of the light sources. In specific embodiments, the control system is configured to control one or more optical properties of the device light, especially in further embodiments in dependence of a user interface, a sensor signal, and a timer. In specific embodiments, the one or more optical properties include the correlated color temperature and the color rendering index.

The system, or apparatus, or device may execute an action in a "mode" or "operation mode" or "mode of operation" or "operational mode". Likewise, in a method an action or stage, or step may be executed in a "mode" or "operation mode" or "mode of operation". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed. However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability). Hence, in embodiments, the control system may control in dependence of one or more of an input signal of a user interface, a sensor signal (of a sensor), and a timer. The term "timer" may refer to a clock and/or a predetermined time scheme. See further also below. Especially, there may be a plurality of modes of operation, such as at least two, like at least three, such as at least five, like at least 8, such as at least 16. A change between the modes of operation may be stepwise or stepless. Control can be analogical or digital. The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. . . . Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface. The control system may also be configured to receive and execute instructions form a remote control. In embodiments, the control system may be controlled via an App on a device, such as a portable device, like a Smartphone or I-phone, a tablet, etc. . . . The device is thus not necessarily coupled to the lighting system, but may be (temporarily) functionally coupled to the lighting system. Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, LiFi, WIFI, ZigBee, BLE or WiMAX, or another wireless technology.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

In specific embodiments, the light generating device may be comprise a control system configured to control the first light source, and the second light source. This may allow controlling the correlated color temperature and/or the color rendering index, and/or the color point of the device light. Hence, in specific embodiments the light generating device may further comprise a control system, wherein the control system is configured to control one or more of the correlated color temperature and the color rendering index of the device light by controlling the first light source and the second light source.

In embodiments, the light generating device may comprise a sensor, such as for example a photo sensor, to sense the light, especially the combined light. In specific embodiments, the light sensor may be arranged in optical contact with the beam combiner. Further, in embodiments the light sensor may be partly shielded by a reflector such that the sensor may sense a small fraction of the (combined) light.

Therefore, in embodiments of the light generating device the first light source light and the second light source light have different spectral power distributions, wherein the light generating device further comprises a control system configured to control one or more of the correlated color temperature and the color rendering index of the device light by controlling the first light source and the second light source. Further, in embodiments the light generating device further comprises a control system configured to control the device light, such as in dependence of one or more of a user interface, a sensor signal, and a timer.

When a luminescent material is applied, and when different types of light sources are applied, the luminescent material may better absorb one type of light source light than one or more other types of light source light. Even, one type of light source light may primarily be absorbed and converted, and one or more other types of light source light may essentially not be absorbed (and not converted). Further, the configuration of the luminescent material (such as reflective or transmissive mode) as well as the concentration of the relevant absorbing species may be chosen such that at least part of the light source light that is absorbed (well) and at least part is transmitted, though in other embodiments essentially all of the type of light source light may be absorbed (and converted). Hence, in embodiments the luminescent material has a first absorption (A1) for the first light source light and a second absorption (A2) for the second light source light wherein $A1/A2 \geq 5$ or wherein $A2/A1 \geq 5$.

Some (further) embodiments are described below. Embodiments in relation to light sources, or laser light sources, may apply to the first light source and/or the second light source (and/or further light sources, would they be applied).

The term "light source" may refer to a semiconductor comprising light-emitting device, such as a light emitting diode (LEDs), a resonant cavity light emitting diode (RCLED), a vertical cavity laser diode (VCSELs), an edge emitting laser, etc. . . . The term "light source" may in specific embodiments also refer to an organic light-emitting diode (comprising light-emitting device), such as a passive-matrix (PMOLED) or an active-matrix (AMOLED). Especially, in embodiments, the light source comprises a solid-state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering). The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation. Especially, in embodiments the term "laser" may refer to a solid-state laser.

Hence, in embodiments the light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:CaF$_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:YCa$_4$O(BO$_3$)$_3$ or Nd:YCOB, neodymium doped yttrium orthovanadate (Nd:YVO$_4$) laser, neodymium glass (Nd:glass) laser, neodymium YLF (Nd:YLF) solid-state laser, promethium 147 doped phosphate glass (147 Pm$^{3+}$:glass) solid-state laser, ruby laser (Al$_2$O$_3$:Cr$^{3+}$), thulium YAG (Tm:YAG) laser, titanium sapphire (Ti:sapphire; Al$_2$O$_3$:Ti$^{3+}$) laser, trivalent uranium doped calcium fluoride (U:CaF$_2$) solid-state laser, Ytterbium doped glass laser (rod, plate/chip, and fiber), Ytterbium YAG (Yb:YAG) laser, Yb$_2$O$_3$ (glass or ceramics) laser, etc. In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

In embodiments, laser light sources may be arranged in a laser bank (see also above). The laser bank may in embodiments comprise heat sinking and/or optics e.g. a paraboloid reflector to collimate the laser light. A parabolic (or paraboloid or paraboloidal) reflector may especially be a reflective surface used to collect or project light. Its shape may be part of a circular paraboloid, that is, the surface generated by a parabola revolving around its axis.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light. The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The light source is especially configured to generate light source light having an optical axis (O), (a beam shape,) and a spectral power distribution. The light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

In embodiments, laser light sources may be arranged in a laser bank. The laser bank may in embodiments comprise heat sinking and/or optics e.g. a lens, multiple lenses or a lens array to collimate the laser light. A laser bank may e.g. comprise at least 10, such as at least 20 laser light sources. In embodiments the laser bank may comprise first light sources. Alternatively or additionally, the laser bank may comprise second laser light sources.

As indicated above, in embodiments the first light source light may essentially consist of the laser light source light. In further specific embodiments, the first light source light may essentially consist of first laser light source light of one or more essentially identical laser light sources (such as from the same bin). Further, as indicated above the first light source may comprise collimating optics to collimate the first laser light source light. Further, as indicated above, in embodiments the second light source light may essentially consist of the laser light source light. In further specific embodiments, the second light source light may essentially consist of second laser light source light of one or more essentially identical laser light sources (such as from the same bin). Further, as indicated above the second light source may comprise collimating optics to collimate the second laser light source light.

In specific embodiments, the first light source is configured to generate blue first light source light having a first peak wavelength $\lambda_1$ selected from the spectral wavelength range of 437-472 nm. In specific embodiments, the second light source is configured to generate red second light source light having a second peak wavelength $\lambda_2$, in specific embodiments selected from the spectral wavelength range of 615-635 nm, such as 615-630 nm, more especially selected from the spectral wavelength range of 615-625 nm, even more especially 616-625 nm. As indicated above, especially the second light source is a second laser light source.

The term "luminescent material" herein especially relates to inorganic luminescent materials, which are also sometimes indicated as phosphors. These terms are known to the person skilled in the art.

In embodiments, quantum dots and/or organic dyes may be applied, and may optionally be embedded in transmissive matrices like e.g. polymers, like PMMA, or polysiloxanes, etc. etc. . . . Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide (CuInS$_2$) and/or silver indium sulfide (AgInS$_2$) can also be used. Quantum dots show very narrow emission band and thus they show saturated colors. Furthermore, the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content. Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nanowires, etcetera. Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

As indicated above, the light generating device especially further comprises a luminescent material configured to convert at least part of the first light source light into luminescent material light having an emission band having wavelengths in one or more of (a) the green spectral wavelength range and (b) the yellow spectral wavelength range.

The term "luminescent material" especially refers to a material that can convert first radiation, especially (one or more of UV radiation and) blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion. In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex} < \lambda_{em}$), though in specific embodiments the luminescent material may comprise down-converter luminescent material, i.e. radiation of a larger wavelength is converted into radiation with a smaller wavelength ($\lambda_{ex} > \lambda_{em}$). In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials. The term "luminescent material" herein may also refer to a material comprising a luminescent material, such as a light transmissive host comprising the luminescent material.

Especially, the luminescent material is configured to convert part of the blue first light source light into luminescent material light having an emission band having wavelengths in one or more of the green and yellow. Further, especially the luminescent material light has one or more wavelengths in the range of about 500-700 nm. Further, in specific embodiments the luminescent material light has a full width half maximum (FWHM) of at least 50 nm, such as at least 75 nm, like in specific embodiments up to about 130 nm (at room temperature). A broad band may provide a higher CRI. Especially, the luminescent material light has a color point in the green or yellow, especially in the yellow. Especially, in embodiments the luminescent material light has a dominant wavelength ($\lambda_{d1}$) selected from the spectral wavelength range of 540-580 nm, more especially selected from the spectral wavelength range of 555-580 nm. Especially, at least 85% of the spectral power (in Watt) of the luminescent material light, such as at least 90%, is within the range of 500-700 nm. Hence, especially the luminescent material is configured to emit luminescent material light at least having one or more wavelengths in the (green and/or) yellow. Further, especially the luminescent material light has emission intensity over the entire wavelength range 520-650, especially even 500-675 nm, such even over the entire wavelength range of 480-700 nm.

Especially good results in terms of CRI and CCT range appear to be achievable with cerium doped garnet type materials. Hence, in specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq0.2$, wherein $y1+y2=1$, wherein $0\leq y2\leq0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as >0.2, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein $0<x2+x3\leq0.1$, and wherein $0\leq y2\leq0.1$. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein $x1+x3=1$, and wherein $0<x3\leq0.2$, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga In and Sc, wherein $x1+x2+x3=1$, wherein $x3>0$, wherein $0<x2+x3\leq0.2$, wherein $y1+y2=1$, wherein $0\leq y2\leq0.2$. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

In yet further embodiments, in addition to the luminescent material, the light generating device may also comprise one or more further luminescent materials, especially configured to convert part of one or more of the first light source light and luminescent material light into further luminescent material light.

Especially, in embodiments the light generating device may also comprise a second luminescent material, especially configured to convert part of one or more of the first light source light and the luminescent material light into second luminescent material light. Further, especially the second luminescent material light may have one or more wavelengths in the range of about 550-700 nm. Further, in specific embodiments the luminescent material light has a full width half maximum (FWHM) of at least 25 nm, such as at least 40 nm, like in specific embodiments up to about 150 nm (at room temperature). Especially, the second luminescent material light may have a color point in the amber and/orange. Especially, in embodiments the second luminescent material light may have a dominant wavelength ($\lambda_{d1}$) selected from the spectral wavelength range of 590-605 nm, especially selected from the spectral wavelength range of 590-600 nm. Especially, at least 50% of the spectral power (in Watt) of the luminescent material light, such as at least 70%, is within the range of 550-650 nm. The second luminescent material light may e.g. have a dominant wavelength in the amber and/or orange wavelength range. Examples of such second luminescent material may e.g. be $M_2Si_5N_8:Eu^{2+}$ and/or $MAlSiN_3:Eu^{2+}$ and/or $Ca_2AlSi_3O_2N_5:Eu^{2+}$, etc., wherein M comprises one or more of Ba, Sr and Ca, especially in embodiments at least Sr. Hence, in embodiments the light generating device may further comprise a second luminescent material configured to convert part of one or more of the first light source light and luminescent material light into second luminescent material light. Especially, the second luminescent material and the luminescent material are configured such, that the second luminescent material converts part of the luminescent material light. Hence, in embodiments the second luminescent material may be configured to convert at least part of the luminescent material light into second luminescent material light (whereby the luminescent material light is red-shifted). Hence, in embodiments, second luminescent may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in CaAlSiN$_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

Especially, the light generating device is based on essentially garnet type luminescent materials. Best results in terms of color point stability, high CRI, and high R9 were obtained with a light generating device essentially based on the blue laser light source, the red laser light source, and essentially only garnet based luminescent material (light). In embodiments, the color rendering index may be at least 80, such as even at least 85, like in embodiments even at least 90. Further, in embodiments an R9 value is at least 50, such as at least 60, like even at least 70.

The light generating device may provide device light (or "lighting device light" or light generating device light") during operation. The light generating device light may comprise the first light source light, the luminescent material light, and the second light source light. In embodiments, the first light source, the luminescent material, and the second light source are chosen such that white device light may be generated. Hence, in specific embodiments the light generating device is configured to generate (in one or more modes of operation) (white) device light comprising the luminescent material light, the second luminescent material light, and the light source light. Especially, the light generating device is configured to provide in a first operational mode white device light comprising the first light source light, the luminescent material light, and the second light source light, with a correlated color temperature selected from the range of 2000-5000 K, such as 2000-3150 K, and a color rendering index selected from the rang of at least 80, like at least 85, like at least about 90.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL. Hence, in specific embodiments the device light has a correlated color temperature selected from the range of 2000-5000 K, such as 2000-4000 K, on or within 10 SDCM from the black body locus.

In even more specific embodiments the control system is configured to keep in a controlling mode the color rendering index over 85, even more especially at least 90.

Especially, in embodiments the luminescent material is transmissive for at least part of the second light source light.

Instead of the term "luminescent body", and similar terms, also the term "light transmissive body", and similar terms, may be applied, as the luminescent body is also transmissive for the luminescent material light.

The light transmissive body may have light guiding or wave guiding properties. Hence, the light transmissive body is herein also indicated as waveguide or light guide. As the light transmissive body is used as light concentrator, the light transmissive body is herein also indicated as light concentrator. The light transmissive body will in general have (some) transmission of one or more of (N)UV, visible and (N)IR radiation, such as in embodiments at least visible light, in a direction perpendicular to the length of the light transmissive body. Without the activator (dopant) such as trivalent cerium, the internal transmission in the visible might be close to 100%.

The transmission of the light transmissive body for one or more (first) luminescence wavelengths may be at least 80%/cm, such as at least 90%/cm, even more especially at least 95%/cm, such as at least 98%/cm, such as at least 99%/cm. This implies that e.g. a 1 $cm^3$ cubic shaped piece of light transmissive body, under perpendicular irradiation of radiation having a selected luminescence wavelength (such as a wavelength corresponding to an emission maximum of the luminescence of the luminescent material of the light transmissive body), will have a transmission of at least 95%. Hence, the luminescent body is herein also indicated "light transmissive body", as this body is light transmissive for the luminescent material light. Herein, values for transmission especially refer to transmission without taking into account Fresnel losses at interfaces (with e.g. air). Hence, the term "transmission" especially refers to the internal transmission. The internal transmission may e.g. be determined by measuring the transmission of two or more bodies having a different width over which the transmission is measured. Then, based on such measurements the contribution of Fresnel reflection losses and (consequently) the internal transmission can be determined. Hence, especially, the values for transmission indicated herein, disregard Fresnel losses. In embodiments, an anti-reflection coating may be applied to the luminescent body, such as to suppress Fresnel reflection losses (during the light incoupling process). In addition to a high transmission for the wavelength(s) of interest, also the scattering for the wavelength(s) may especially be low. Hence, the mean free path for the wavelength of interest only taking into account scattering effects (thus not taking into account possible absorption (which should be low anyhow in view of the high transmission), may be at least 0.5 times the length of the body, such as at least the length of the body, like at least twice the length of the body. For instance, in embodiments the mean free path only taking into account scattering effects may be at least 5 mm, such as at least 10 mm. The wavelength of interest may especially be the wavelength at maximum emission of the luminescence of the luminescent material. The term "mean free path" is especially the average distance a ray will travel before experiencing a scattering event that will change its propagation direction. The transmission can be determined by providing light at a specific wavelength with a first intensity to the light transmissive body under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

The terms "radiationally coupled" or "optically coupled" may especially mean that (i) a light generating element, such as a light source, and (ii) another item or material, are associated with each other so that at least part of the radiation emitted by the light transmissive source is received by the item or material. In other words, the item or material is configured in a light-receiving relationship with the light generating element. At least part of the radiation of light source will be received by the item or material. In embodiments, also one or more optics, like a lens, a reflector, an optical filter, may be configured in the optical path between light source and item or material. Hence, the optical component may be radiationally coupled with the light sources. Further, the luminescent material may be radiationally coupled with the light sources (via the optical component); hence, the luminescent material may in fact also be radiationally coupled to the optical component.

In embodiments, the luminescent material is comprised by or provided as a (light transmissive) body. In embodiment, the luminescent material is comprised by or provided as (light transmissive) layer. The layer may in embodiments also be indicated as body. In specific embodiments, the light generating device comprises a luminescent body, wherein the luminescent body comprises the luminescent material, and wherein the luminescent body is a ceramic body. Likewise, this may apply to the second luminescent material. In specific embodiments, the body may comprise both the luminescent material and the second luminescent material. Hence, in embodiments the luminescent body comprises the second luminescent material. Hence, in specific embodiment a ceramic body comprises the luminescent material and the second luminescent material.

In embodiments, the (first) luminescent is comprised by a single crystal. In (other) embodiments, the (first) luminescent is comprised by a ceramic body. In yet other embodiments, the (first) luminescent is comprised by a polycrystalline material, such as a polycrystalline material layer. This may in embodiments be a powder layer or a compacted powder layer. In specific embodiments, a powder layer or a compacted powder layer may comprise both the luminescent material and the second luminescent material. Hence, in embodiments a powder layer or a compacted powder layer comprises the second luminescent material. In yet other embodiments, a multi-layer may be applied, wherein a first layer comprises the luminescent material (and essentially no second luminescent material) and a second layer comprises the second luminescent material (and essentially not the luminescent material). Herein, "essentially not" may indicate a weight ratio of <0.1, such as <0.01. Therefore, in yet further specific embodiments the luminescent body may comprises one or more of a ceramic body and a multi-layer material. The multi-layer material may thus comprise the luminescent material and the second luminescent material, and may in specific embodiments also be a ceramic body.

When a luminescent material is configured downstream of the optical element, first light source light and/or second light source light that propagates away from the luminescent material together with the luminescent material light, and may thus form in embodiments the device light, may have lost some of its collimation due to e.g. scattering. Hence, downstream of the luminescent material, optionally further collimating optics may be applied, depending on the specific application. As indicated above, in specific embodiments essentially all first light source light and second light source light may be converted by the luminescent material.

The lumen equivalent of the white device light may in embodiments be selected from the range of 290-370 Lm/W, such as 300-360 Lm/W. In embodiments, the light generating device is configured to provide the luminescent light with power emitted from a radiation exit face of the luminescent body having a power density of 4 W/mm$^2$, especially a power density at least 7 W/mm$^2$, more especially at least 9 W/mm$^2$, even more especially at least 13 W/mm$^2$. Hence, in embodiments in an operational mode of the light generating device, the light generating device is configured to generate the luminescent material light from a radiation exit surface (or radiation exit face) of the luminescent converter with a power density of at least 4 W/mm$^2$. In yet further specific embodiments, the light generating device may be configured to provide luminescent light in combination with blue and/or red laser light coming out the same surface as the luminescent light providing white light with a brightness of at least 2000 lm/mm$^2$, more especially at least 3000 lm/mm$^2$, even more especially at least 6000 lm/mm$^2$. Herein, "lm" refers to lumen.

In yet a further aspect, the invention also provides a luminaire comprising the light generating device as defined herein. The luminaire may further comprise a housing, optical elements, louvres, etc. etc.

The light generating device (or luminaire) may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting, etc.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 2a-2c schematically depict some further embodiments;

DETAILED DESCRIPTION OF THE EMBODIMENTS

As indicated above, the invention provides a light generating device comprising a plurality of light sources and an optical component comprising an array of prismatic elements.

Figure 1A:
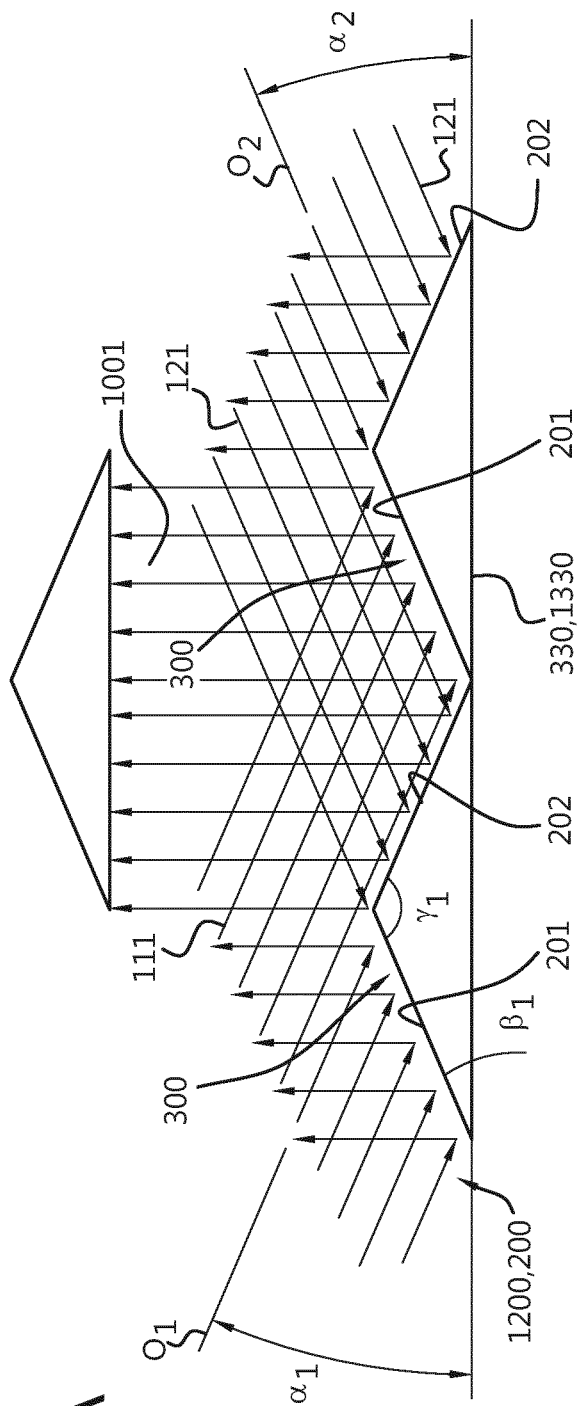
FIG. 1a-1i schematically depict some embodiments.
Figure 1B:
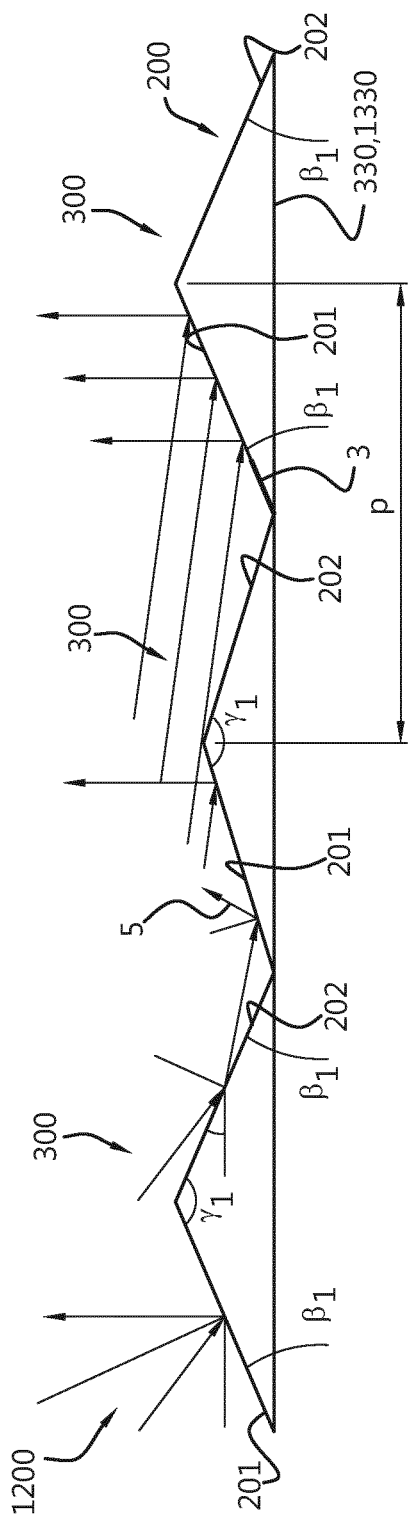

FIGS. 1a and 1b schematically depict some embodiments of an optical component 1200 comprising an array 200 of prismatic elements 300. The optical component 1200, especially the array 200, is configured in a light receiving relationship with the n light sources (not depicted, see however FIGS. 2a, 2b, 2c, 3a, and 3b).

The array 200 of prismatic elements 300 comprises k1 parallel arranged first prismatic faces 201 and k2 parallel arranged second prismatic faces 202. Here, especially k1>2 and k2>2. As schematically depicted, the first prismatic faces 201 and the second prismatic faces 202 are not mutually parallel. The prismatic faces (i.e. the first prismatic face and the second prismatic face) have a mutual angle γ1 unequal to 0° or 180°. The prismatic element may have a symmetric or non-symmetric cross-section. Here, the base angles β1 are identical. In the (specific) embodiments schematically depicted herein, the prismatic faces are mirror images (of each other).

The plurality of n light sources comprises a first subset of one or more first light sources configured to generate collimated first light source light 111 and a second subset of one or more second light sources configured to generate collimated second light source light. Especially, n≥2.

As schematically depicted, the first light sources (light sources not shown; but light source light 111,121 is) are configured to irradiate the first prismatic faces 201 and the second light sources are configured to irradiate the second prismatic faces 202.

Further, as also schematically depicted the prismatic elements 300 are configured to reflect or refract the collimated first light source light 111 and the collimated second light source light 121 as coincident beams of first light source light 111 and second light source light 121. In FIGS. 1a and 1b, reflection is applied.

FIGS. 1a-1b schematically depict an embodiment wherein the principle of operation of the beam combiner is shown. A (laser) beam of first light source light 111 impinges from the left onto an array of reflective prisms; a (laser) beam of second light source light 121 impinges from the right. The two reflected beams are co-linear, and they are spatially interleaved. There are no dark gaps in the final light distribution provided the following design rules of specific embodiments are met.

In FIGS. 1a-1b the possible design rules for the beam combiner are illustrated. The reflective micro-prisms have a slope angle or base angle β1. The laser beams are directed towards the micro-prism array under an angle $α_1$ with the surface as indicated (90°-$α_1$ with the surface normal). If the reflected light must be at an angle of 90° with the surface, then $α_1+2β_1=90°$. If a (laser) beam may only hit the positive slopes and not the negative ones, since that would generate stray light, then $α_1≤β_1$. Finally, if the full prism slopes must be illuminated (flashed) since otherwise dark gaps would appear, then $α_1=β_1=30°$. In FIG. 1b, reference 5 indicates stray light; reference 3 indicates a non-flashed area. The top angle is indicated with reference γ1.

Hence, as shown in amongst others FIGS. 1a-1b, in embodiments the prismatic elements 300 may be reflective for the first light source light 111 and the second light source light 121. Especially, the first prismatic faces 201 and the second prismatic faces 202 of the prismatic elements 300 define a first top angle γ1 selected from the range of 120°±10°. Further, as shown in FIG. 1a, relative to a plane 330 the first prismatic faces 201 and the second prismatic faces 202 of the prismatic elements 300 have first base angles $β_1$ selected from the range of 30°±5°, wherein the first light source light 111 has a first optical axis O1 and wherein the second light source light 121 has a second optical axis O2 wherein the optical axes O1,O2 have beam angles $α_1,α_2$ with the plane 330 that are equal to or smaller than the respective base angles $β_1$.

Reference P in FIG. 1b indicates a pitch of the prismatic elements 300. The prismatic elements may have a pitch selected from the range of about 5-100 μm, even more especially selected from the range of about 5-50 μm.

Figure 1C:
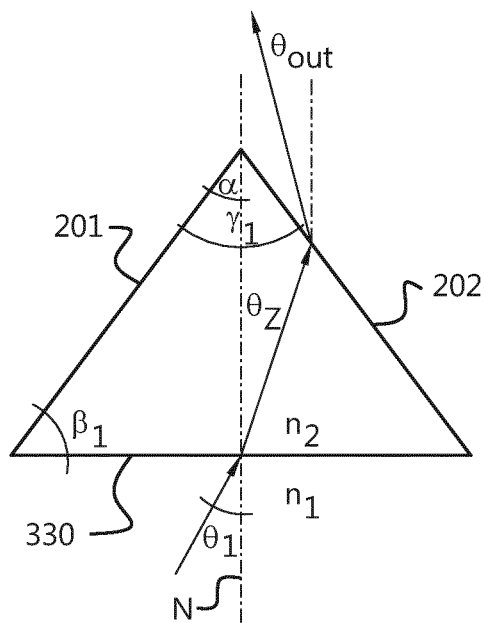
Figure 1D:
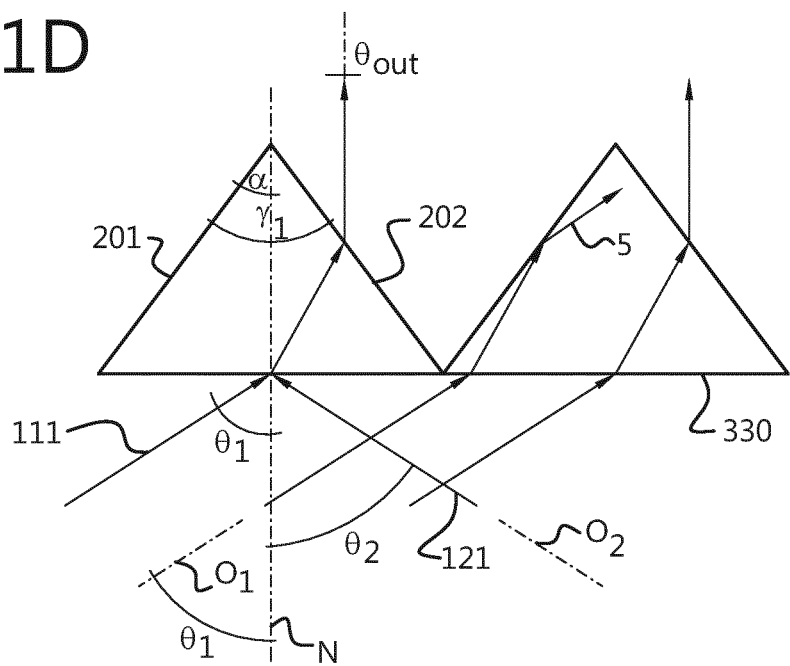
Figure 1E:
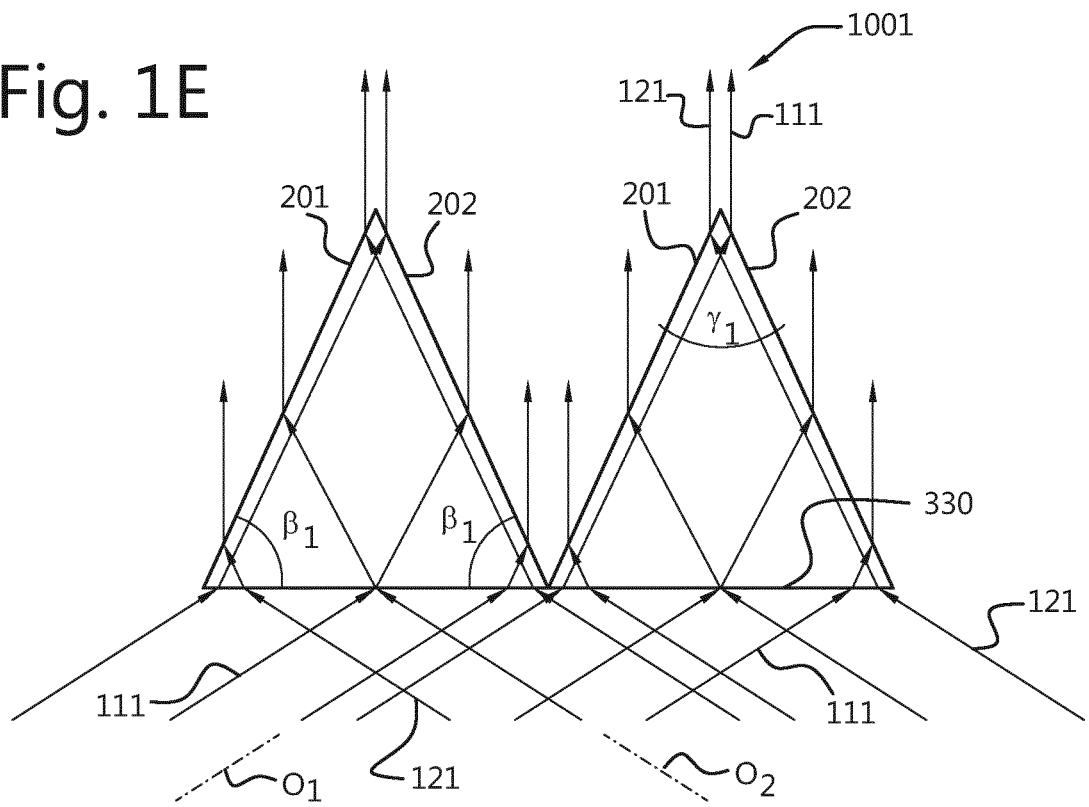

FIGS. 1c-1e schematically depicts other embodiments, using a transmissive micro-optical structure. Two (laser) beams enter a refractive micro-prism array from below, with incidence angle $θ_1$ and $θ_2$, for the first light source light 111 and the second light source light 121, respectively, as indicated. The exit angles $θ_{out}$ should especially be co-linear. The micro-prisms have a refractive index n2 and a half top angle α and a full top angle γ1. The exit angle $θ_{out}$ is a function of the refractive indices n1 and n2, the incidence angle $θ_1$ and the prism half top angle α. By a proper choice of parameters, stray light 5 can be prevented, and no dark stripes appear in the final distribution. A first constraint may be that the beams should be co-linear: $θ_{out}=0$; A second constraint may be that there is no stray light and no dark gaps: $θ_Z=α$. Surprisingly, for a given refractive index there exists only one solution for $θ_1$ and α. Likewise this applies for $θ_2$.

Hence, FIGS. 1c-1e schematically depict embodiments wherein the prismatic elements 300 are refractive for the first light source light 111 and the second light source light 121. Especially, the first light sources are configured to irradiate the first prismatic faces 201, wherein the first light source light 111 propagates via the prismatic elements 300 to the first prismatic faces 201. Further, especially the second light sources are configured to irradiate the second prismatic faces 202, wherein the second light source light 121 propagates via the prismatic elements 300 to the second prismatic faces 202. Hence, whereas in the reflective embodiments the prismatic faces 201 and 202 are directly irradiated, in the refractive embodiments the prismatic faces 201 and 202 are indirectly irradiated.

Especially, the first prismatic faces 201 and the second prismatic faces 202 of the prismatic elements 300 define a first top angle γ1 selected from the range of 55°±10°.

Further, especially the prismatic elements 300 comprise a base plane 1330, wherein the first light source light 111 has a first optical axis O1 and wherein the second light source light 121 has a second optical axis O2, wherein the optical axes O1,O2 have beam incidence angles $θ_1,θ_2$ with a normal N to the base plane 1330 that are selected from the range of 45°±10°.

For various refractive indices these were found with a simulation model and are given in the table below:

|  | n | | | | | | | | |
| --- | --- | --- | --- | --- | --- | --- | --- | --- | --- |
|  | 1.45 | 1.46 | 1.47 | 1.48 | 1.49 | 1.50 | 1.51 | 1.52 | 1.53 |
| top angle | 25.81 | 26.00 | 26.19 | 26.37 | 26.55 | 26.73 | 26.90 | 27.07 | 27.23 |
| incidence angle | 39.15 | 39.80 | 40.45 | 41.10 | 41.76 | 42.43 | 43.09 | 43.77 | 44.44 |

|  | n | | | | | | |
| --- | --- | --- | --- | --- | --- | --- | --- |
|  | 1.54 | 1.55 | 1.56 | 1.57 | 1.58 | 1.59 | 1.60 | 1.61 |
| top angle | 27.40 | 27.56 | 27.71 | 27.87 | 28.02 | 28.16 | 28.3 | 28.45 |
| incidence angle | 45.12 | 45.81 | 46.51 | 47.21 | 47.91 | 48.63 | 49.35 | 50.08 |

Figure 1F:
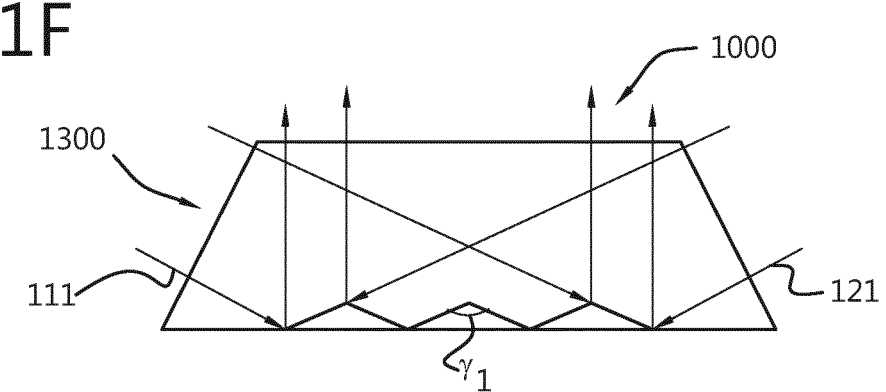
Figure 1G:
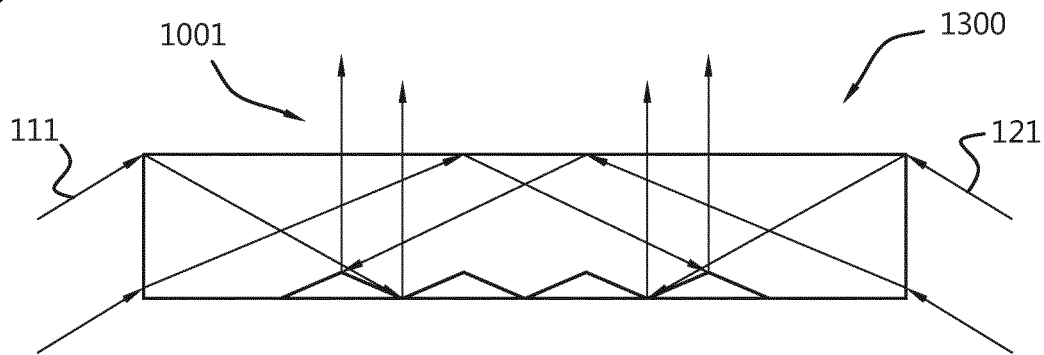
Figure 1H:
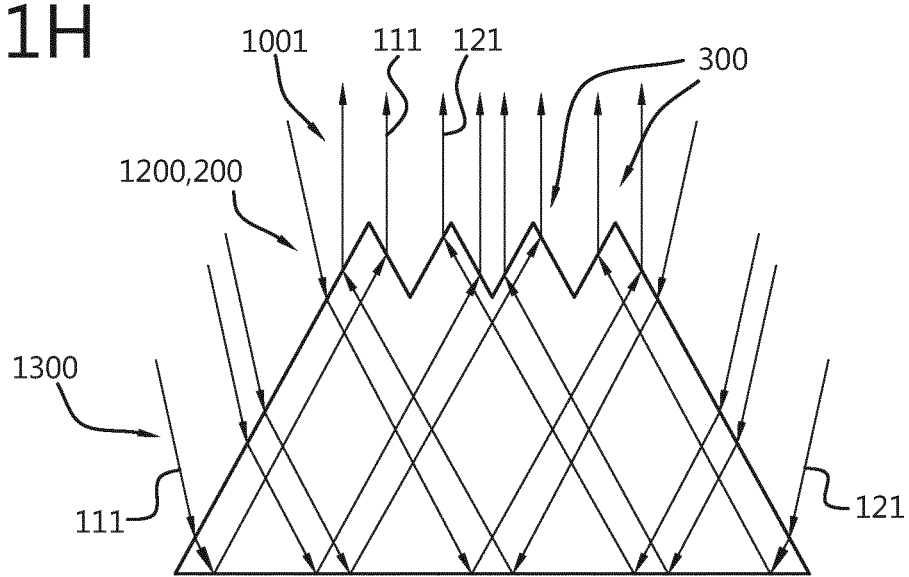
Figure 1I:
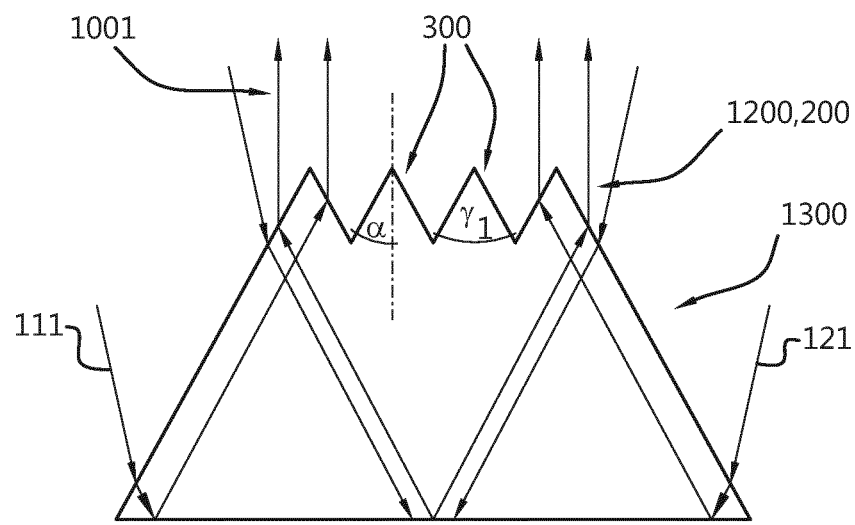

FIGS. 1f-1i schematically depict embodiments of the light generating device 1000 comprising a light transmissive body 1300, wherein the prismatic elements 300 are comprise by the light transmissive body 1300. FIGS. 1f-1g schematically depict embodiments wherein the prismatic elements 300 are used as reflective elements. FIGS. 1h-1i schematically depict embodiments wherein the prismatic elements 300 are used as refractive elements. Here, in embodiments the light transmissive body 1300 with the prismatic elements may be a monolithic element.

Figure 2A:
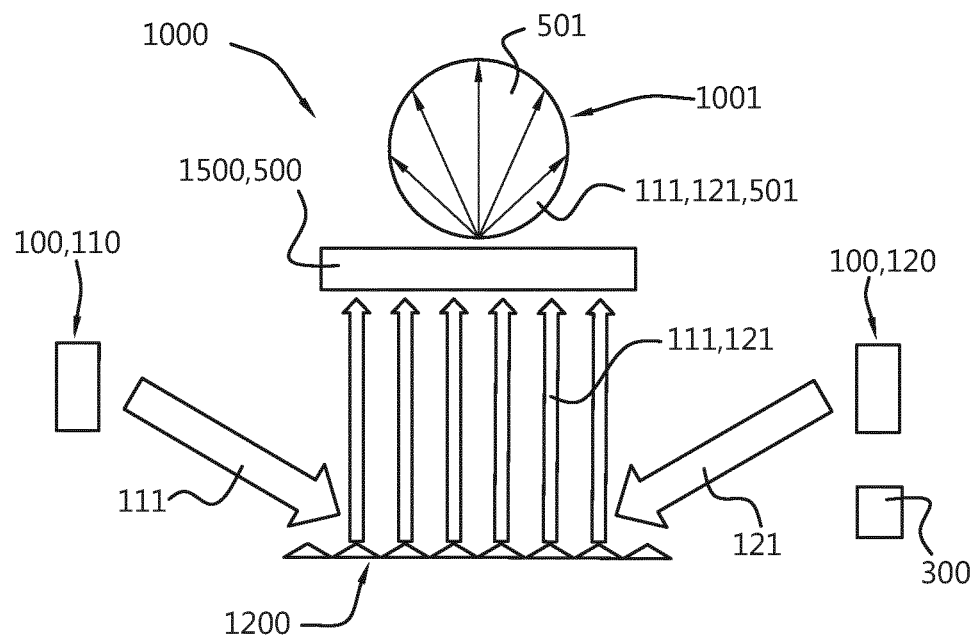
Figure 2B:
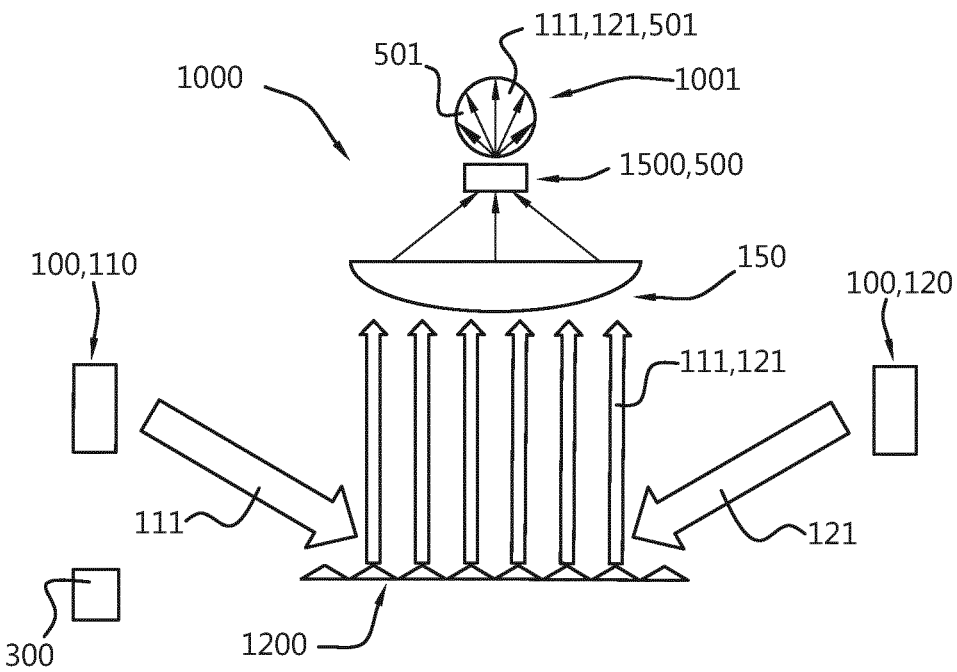

FIGS. 2a-2c schematically depict embodiments wherein the beam combiner is used to provide the combined, co-linear, collimated beams. In the embodiments schematically depicted in FIGS. 2a-2b, these are used to irradiate a transmissive converter. Here, transmissive configurations are schematically depicted. However, reflective configurations may also be possible. As schematically depicted in FIG. 2b, also a lens may be used to focus the combined beams onto a converter element.

FIG. 2a schematically depicts an embodiment of the light generating device 1000 comprising a plurality of n light sources 100, and the optical component 1200 comprising the array 200 of prismatic elements 300. The plurality of n light sources 100 comprise a first subset of one or more first light sources 110 configured to generate collimated first light source light 111 and a second subset of one or more second light sources 120 configured to generate collimated second light source light 121, wherein n≥2. The array 200 of prismatic elements 300 is configured in a light receiving relationship with the n light sources 100, wherein the array of prismatic elements 300 comprises k1 parallel arranged first prismatic faces 201 and k2 parallel arranged second prismatic faces 202, wherein k1>2 and wherein k2>2, wherein the first prismatic faces 201 and the second prismatic faces 202 are not mutually parallel. As shown, the first light sources 110 are configured to irradiate the first prismatic faces 201 and the second light sources 120 are configured to irradiate the second prismatic faces 202. Further, the prismatic elements 300 are configured to reflect or refract the collimated first light source light 111 and the collimated second light source light 121 as coincident beams of first light source light 111 and second light source light 121.

The light generating device 1000 may in embodiments further comprise a luminescent material 500 configured downstream of the prismatic elements 300. Especially, the luminescent material 500 is configured to convert at least part of one or more of the first light source light 111 and the second light source light 121 into luminescent material light 501.

Reference 150 indicates optics, such as a lens.

In yet further specific embodiments, the light generating device 1000 may comprise a ceramic body 1500 configured downstream of the prismatic elements 300, wherein ceramic body 1500 comprises such luminescent material 500. For instance, the luminescent material may be provided as ceramic body. The ceramic body 1500 may in embodiments be transmissive for at least part of one or more of the first light source light 111 and the second light source light 121.

Hence, as schematically depicted the light generating device 1000 may especially be configured to generate device light 1001 comprising one or more of (i) the first light source light 111, (ii) the second light source light 121, and (iii) (optionally) the luminescent material light.

In specific embodiments, the light generating device 1000 may be configured to generate white device light in one or more operational modes of the light generating device 1000.

In embodiments, the first light source light 111 and the second light source light 121 have different spectral power distributions.

Further, in embodiments the light generating device 1000 may further comprise a control system 300 configured to control one or more of the light sources.

In specific embodiments, the control system 300 may be configured to control one or more of the correlated color temperature and the color rendering index of the device light 1001 by controlling the first light source 110 and the second light source 20.

The luminescent material 500 may better absorb one or more wavelengths than one or more other wavelengths. Hence, in embodiments the luminescent material 500 may have a first absorption A1 for the first light source light 111 and a second absorption A2 for the second light source light 121 wherein A1/A2≥5 or wherein A2/A1≥5. For instance, the luminescent material 500 may absorb at least part of the first light and absorb essentially not second light source light, or the other way around.

FIG. 2c also schematically depicts an embodiment of the light generating device 1000 wherein the first light sources 110 comprise first laser light sources 10 configured to generate first laser light source light 11 and collimating elements 15 configured to provide collimated first laser light source light 11, and the second light sources 120 comprise second laser light sources 20 configured to generate second laser light source light 21 and collimating element 25 configured to provide collimated second laser light source light 21, and wherein the collimators 15,25 comprise paraboloid reflectors.

Further, FIG. 2c also schematically depicts an embodiment wherein the light generating device 1000 comprises a thermally conductive body 400. For instance, the plurality of n light sources 100 and/or the prismatic elements 300 may be thermally coupled with the thermally conductive body 400.

A possible embodiment of the beam combiner is shown in FIG. 2c. For instance, a blue and a red diode laser on their sub-mounts are mounted to a central heat sink. They are in the focal points of paraboloid reflectors that collimate the light at an angle of e.g. 60° with the surface normal to a micro-prismatic reflector. After reflection from the prism, the two beams are now co-linear and interleaved.

FIGS. 2a-2c schematically show a cross-sectional view. The prismatic elements may be elongated perpendicular to the plane of drawing and a plurality of first light source 110 and/or a plurality of second light sources 120 may be configured in a row perpendicular to the plane of drawing (and essentially parallel to the prismatic elements), see e.g. FIGS. 3a-3b.

Figure 3A:
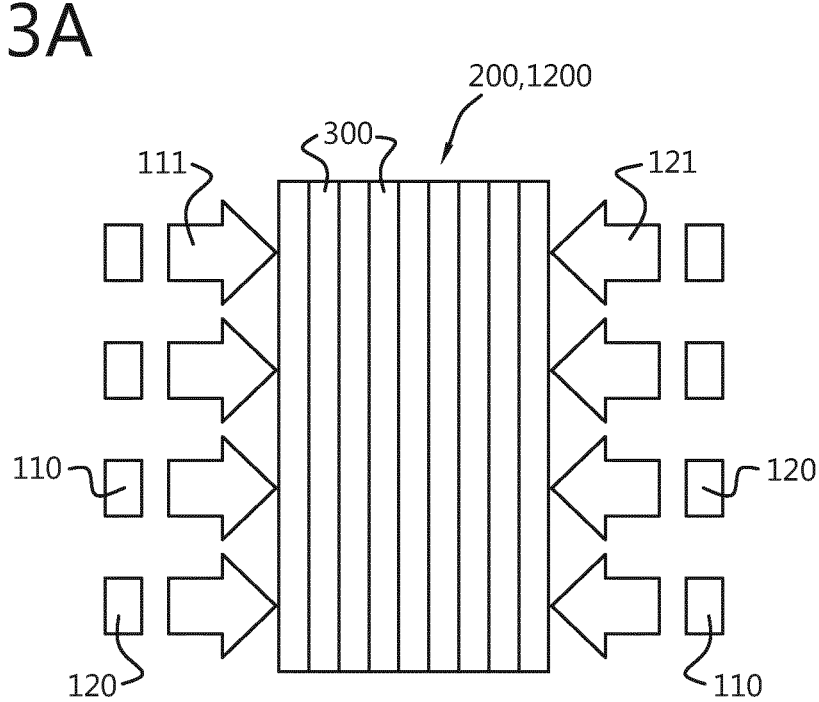
FIGS. 3a-3b schematically depict yet some further embodiments.
Figure 3B:
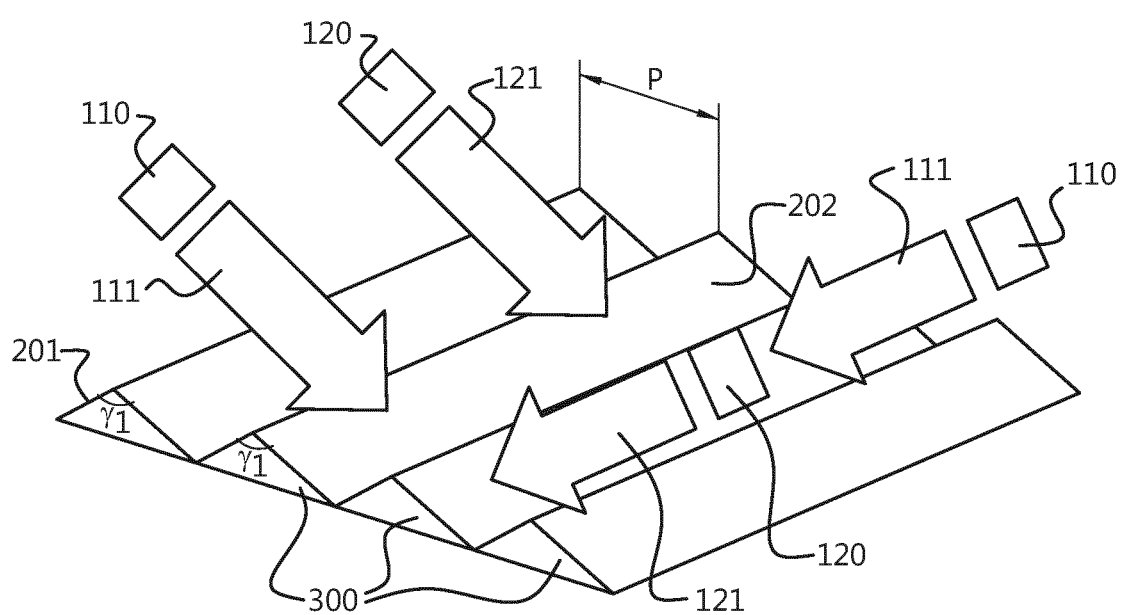

An example of the performance is shown in FIGS. 3a-3b. For instance, the micro-prism pitch P is chosen 0.1 mm. If the micro-prism pitch P size is chosen smaller, like 0.05 mm, where no structure may be visible anymore in the resulting beam (cross-section). Referring to FIGS. 3a-3b, embodiment may e.g. comprise one or more of:

The two lasers can have the same wavelength or different wavelengths, e.g. RGB.
Prism slope angles can be smaller than 30° (but dark stripes may appear).
A free-shape reflector (i.e. not a paraboloid) can be applied to collimate the individual lasers.
More than two lasers are combined in a linear array fashion (see e.g. FIGS. 3a-3b).

Hence, in embodiments e.g. the beams of a plurality blue laser diodes, such as at least four, may be combined. Alternatively or additionally, the beams of a plurality of red laser diodes, such as at least 2, may be combined. The combined light may be used to irradiate a luminescent material (in the reflective or transmissive mode), to generate luminescent material light. the blue laser diode light may be used to generate the luminescent material light by full or partial conversion.

Another way to combine more than 2 lasers (e.g. 4) could be using a pair of the modules, each with 2 lasers mixed. The collimated beams from each of the modules may be combined by a third micro-prism reflector. The orientation of interleaving of the two modules is orthogonal to the direction of structures of the final micro-prism mirror.

Hence, amongst others the invention may provide a high brightness light source with good color quality, a retail spot, an entertainment spot, narrow beam width spots, etc.

As schematically depicted in FIGS. 3a-3b, in embodiments the triangular prisms may have two (elongated) essentially flat faces and a base face (which may also essentially be flat).

Figure 4:
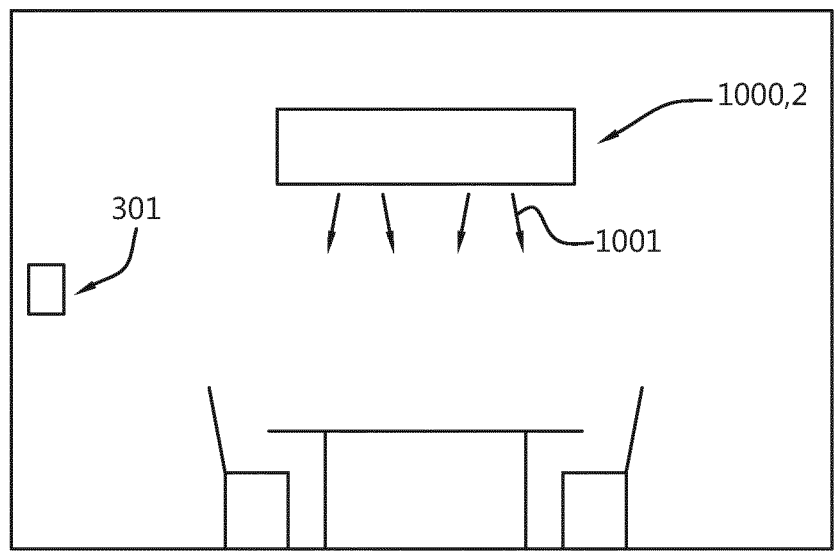
FIG. 4 schematically depicts a further embodiment. The schematic drawings are not necessarily to scale.

FIG. 4 schematically depicts an embodiment of a luminaire 2 comprising the light generating device 1000 as described above. Reference 301 indicates a user interface which may be functionally coupled with the control system (not depicted) comprised by or functionally coupled to the lighting system 1000.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating device comprising (i) a plurality of n light sources, and (ii) an optical component comprising an array of prismatic elements, wherein:
the plurality of n light sources comprise a first subset of one or more first light sources comprising a first laser light source and being configured to generate collimated first light source light and a second subset of one or more second light sources comprising a second laser light source and being configured to generate collimated second light source light, wherein n≥2;
the array of prismatic elements is configured in a light receiving relationship with the plurality of n light sources, wherein the array of prismatic elements comprises k1 parallel arranged first prismatic faces and k2 parallel arranged second prismatic faces, wherein k1≥2 and wherein k2≥2, wherein the first prismatic faces and the second prismatic faces are not mutually parallel;
the first light sources are configured to irradiate the first prismatic faces and the second light sources are configured to irradiate the second prismatic faces; and
the prismatic elements are configured to reflect or refract the collimated first light source light and the collimated second light source light as coincident beams of first light source light and second light source light,
wherein the first light source light and the second light source light have different spectral power distributions, wherein the light generating device further comprises control system configured to control one or more of the correlated color temperature, the color rendering index and the color point of the device light by controlling the first light source and the second light source;
wherein the light generating device is arranged for generating white light with the correlated color temperature selected from the range of 2700 K to 6500 K and with the color rendering index being at least 80; and
wherein relative to a plane the first prismatic faces and the second prismatic faces of the prismatic elements have predetermine first base angles (β1), wherein the first light source light has a first optical axis and wherein the second light source light has a second optical axis wherein the optical axes have beam angles (α1,α2) with the plane that are equal to or smaller than the respective base angles (β1).

2. The light generating device according to claim 1, wherein (i) the first light sources comprise first laser light sources configured to generate first laser light source light and a collimating element configured to provide collimated first laser light source light, and (ii) the second light sources comprise second laser light sources configured to generate second laser light source light and a collimating element configured to provide collimated second laser light source light, and wherein the collimators comprise paraboloid reflectors.

3. The light generating device according to claim 1, comprising a thermally conductive body, wherein the plurality of n light sources and the prismatic elements are thermally coupled with the thermally conductive body.

4. The light generating device according to claim 1, wherein the prismatic elements are reflective for the first light source light and the second light source light.

5. The light generating device according to claim 4, wherein the first prismatic faces and the second prismatic faces of the prismatic elements define a first top angle (γ1) selected from the range of 120°±10°.

6. The light generating device according to claim 4, wherein the first base angles (β1) are selected from a range of 30°±5°.

7. The light generating device according to claim 1, wherein the prismatic elements are refractive for the first light source light and the second light source light, and wherein (i) the first light sources are configured to irradiate the first prismatic faces, wherein the first light source light propagates via the prismatic elements to the first prismatic faces, and (ii) the second light sources are configured to irradiate the second prismatic faces, wherein the second light source light propagates via the prismatic elements to the second prismatic faces.

8. The light generating device according to claim 7, wherein the first prismatic faces and the second prismatic faces of the prismatic elements define a first top angle (γ1) selected from the range of 55°±10°.

9. The light generating device according to claim 7, wherein the prismatic elements comprise a base plane, wherein the first light source light has a first optical axis and wherein the second light source light has a second optical axis, wherein the optical axes have beam incidence angles with a normal (N) to the base plane that are selected from the range of 45°±10°.

10. The light generating device according to claim 1, comprising a light transmissive body, wherein the prismatic elements are comprised by the light transmissive body.

11. The light generating device according to claim 1, further comprising a luminescent material configured downstream of the prismatic elements, wherein the luminescent material is configured to convert at least part of one or more of the first light source light and the second light source light into luminescent material light.

12. The light generating device according to claim 11, further comprising a ceramic body configured downstream of the prismatic elements, wherein ceramic body comprises the luminescent material, and wherein the ceramic body is transmissive for at least part of one or more of the first light source light and the second light source light.

13. The light generating device according to claim 1, wherein the light generating device is configured to generate device light comprising one or more of (i) the first light source light, (ii) the second light source light, and (iii) the luminescent material light, wherein the light generating device is configured to generate white device light in one or more operational modes of the light generating device.

14. The light generating device according to claim 1, wherein the color rendering index is at least 85.

15. A luminaire comprising the light generating device according to claim 1.

* * * * *